United States Patent [19]

Rehberg et al.

[11] Patent Number: 5,238,480
[45] Date of Patent: Aug. 24, 1993

[54] FERTILIZER COMPOSITIONS AND METHOD OF MAKING SUCH COMPOSITIONS

[75] Inventors: Bobby E. Rehberg, Winter Haven; William L. Hall, Lakeland, both of Fla.

[73] Assignee: Vigoro Industries, Inc., Fairview Heights, Ill.

[21] Appl. No.: 374,109

[22] Filed: Jun. 29, 1989

[51] Int. Cl.$^5$ ............................. C05C 9/00; C05G 3/10
[52] U.S. Cl. .......................................... 71/28; 71/64.07
[58] Field of Search ........................ 71/1, 11, 27–30, 71/64.07, 64.10, 64.02

[56] References Cited

U.S. PATENT DOCUMENTS

| | | | |
|---|---|---|---|
| 3,024,098 | 3/1962 | Austin et al. | 71/29 |
| 3,062,637 | 11/1962 | Marples et al. | 71/2.4 |
| 3,365,288 | 1/1963 | Detmer et al. | 71/64 |
| 3,392,007 | 7/1968 | Christoffel et al. | 71/33 |
| 3,576,613 | 4/1971 | Fleming | 71/28 |
| 3,647,416 | 3/1972 | Messman | 71/29 |
| 3,725,029 | 4/1973 | Blackmore | 423/545 X |
| 3,870,755 | 3/1975 | Kamo et al. | 260/553 R |
| 3,925,053 | 12/1975 | Keahy | 71/29 |
| 4,002,458 | 1/1977 | Hofacker | 71/64 |
| 4,023,955 | 5/1977 | Mueller | 71/64 |
| 4,026,696 | 5/1977 | Young | 71/28 |
| 4,062,890 | 12/1977 | Shank | 260/553 R |
| 4,082,533 | 4/1978 | Wittenbrook et al. | 71/28 |
| 4,142,885 | 3/1979 | Heumann et al. | 71/28 |
| 4,304,589 | 12/1981 | Kamo | 71/29 |
| 4,560,400 | 12/1985 | Allen et al. | 71/29 |
| 4,587,358 | 5/1986 | Blouin | 564/3 |
| 4,676,821 | 6/1987 | Gullett et al. | 71/28 |
| 4,704,230 | 11/1987 | Blackmore | 252/502 |
| 4,711,659 | 12/1987 | Moore | 71/64.12 |
| 4,732,762 | 3/1988 | Sjogren | 424/409 |
| 4,743,289 | 5/1988 | Mickus et al. | 71/63 X |
| 4,786,438 | 11/1988 | Blackmore | 252/510 |

OTHER PUBLICATIONS

M. Hamamoto, "Isobutylidene Diurea as a Slow Acting Nitrogen Fertiliser and the Studies in this Field in Japan," Proceedings No. 90, *The Fertiliser Society*, Paper read in London on Jan. 27, 1966.
National Fertilizer Development Center, TVA, Muscle Shoals, Alabama 35660, Product Techsheet "Urea LS TM" (dated Aug. 1987).
National Fertilizer Development Center, TVA, Muscle Shoals, Alabama 35660, Product Techsheet, "Sulfur Coated Area LS (SCULS TM)" (dated Mar. 1988).
National Fertilizer Development Center, TVA, Muscle Shoals Alabama 35660, Excerpt from TVA Bulletin Y-198, "New Developments in Fertiliser Technology, 16th Demonstration, Oct. 1987".
National Fertilizer Development Center, TVA, Muscle Shoals, Alabama 35660, "Urea LS TM —A New Fertilizer Product From The National Fertilizer Development Center" (undated).

*Primary Examiner*—Ferris Lander
*Attorney, Agent, or Firm*—McDermott, Will & Emery

[57] ABSTRACT

An improved fertilizer composition is disclosed, including particles of a sparingly soluble fertilizer source having porous outer surfaces (for example, IBDU®) which have been coated with a hard outer coating that substantially covers the surface of each of the particles and substantially fills the pores in the surface of each of the particles. The particles are thereby hardened by the coating and are given increased resistance to abrasion and dust formation. The hardened outer coating is preferably formed when a liquid binder (which preferably includes a mixture of urea and a lignosulfonate) is sprayed onto the particles and then allowed to harden or cure. A process for making such hardened fertilizer particles is also disclosed.

12 Claims, 1 Drawing Sheet

5,238,480

FERTILIZER COMPOSITIONS AND METHOD OF MAKING SUCH COMPOSITIONS

FIELD OF THE INVENTION

This invention relates generally to dust-resistant fertilizer compositions, and is particularly directed to a hardened, coated granular fertilizer and the method of making such a fertilizer.

BACKGROUND OF THE INVENTION

Many fertilizers, including those commonly used by homeowners on their lawns, consist of granules or particles of a nutritive material. This nutritive material typically includes a blended combination of nitrogen (N) source, a phosphorus (P) source, and a potassium (K) source. The most expensive component of the fertilizer is usually the nitrogen (N) source, especially if the nitrogen is in a so-called "slow-release" form. The present invention relates to improved granular source materials which can be used in making blended fertilizers, including improved nitrogen sources.

During manufacture, nitrogen (N) sources and other fertilizer source materials used as components in commercial fertilizers are granulated by conventional granulation techniques, prilled, or otherwise formed into particles. As a result, they often consist of a mixture of granules of varying sizes. Since commercial fertilizers come in certain preferred size ranges, it is frequently desirable to separate the granules by size. Any oversized or undersized material can then be "compacted" and/or recycled and processed into granules having the desired size.

Granules made by granulation techniques typically are not perfectly smooth and round. Instead, they are irregular in shape and have small protrusions on their surfaces. Granules made by compaction are even more irregular and often have jagged edges. These protrusions and jagged edges tend to break off during later processing of the fertilizer, such as during storage, handling, transportation, mixing, sizing, elevation, packaging and use. Often clouds of dust form in the area where the material is being processed or handled. In addition, since the material is often transported from the manufacturing plant to the fertilizer blending plant in rail cars, significant degradation of the material can occur during moving and unloading and substantial quantities of dust can be created.

For several reasons, this dust is undesirable and has caused a significant problem in the manufacture and processing of blended fertilizers. First, depending on the source material being used to make the fertilizer, the dust may be toxic and, therefore, may pose a health and safety risk to persons inhaling it and otherwise coming in contact with it. Even if the dust is not toxic, it may be unpleasant or noxious to those who handle or use the fertilizer. Moreover, dust causes significant environmental problems, both in the manufacturing plant and in the fertilizer blending plant where the fertilizer source materials are blended to form commercial fertilizers. The Environmental Protection Agency (EPA), as well as state and local agencies, mandates that such facilities maintain certain acceptable levels of particulate matter in the air. Substantial fines may be imposed if airborne particulates exceed the acceptable limits. To avoid these fines, it is necessary to install dust emission systems and scrubber systems, which filter particulate matter from the air. Such systems are often costly and usually require a significant capital investment. Finally, dust created during processing of the fertilizer is difficult to recover, and significant amounts of material are effectively lost during processing, transportation, and handling.

When the fertilizer source material is urea, it has been proposed to add so-called conditioning or hardening agents to the urea so that when it is granulated the resulting particles are harder and more resistant to abrasion and dust formation. Generally, these conditioning agents are added to the urea solution before it is granulated, that is, "upstream" of the granulator. For example, in U.S. Pat. No. 4,587,358, it is proposed that certain lignin compounds be mixed into the urea solution ("synthesis liquor") or into the urea melt upstream of the granulator. In this way, the hardening material is uniformly dissolved into the urea fertilizer to form a homogeneous mixture prior to granulation.

One problem with such processes is that they must be used during manufacture of the fertilizer source material, since they involve changing the composition of the material itself. Many manufacturers are not equipped to use such processes during manufacture. In addition, such processes have not presently been adapted to the manufacture of fertilizer source materials other than urea.

For example, the popular slow-release nitrogen source isobutylidene diurea (sold by Vigoro Industries, Inc. under the trademark IBDU ®), is manufactured by chemically reacting urea and isobutyraldehyde in a "pug mill" to form IBDU ® granules. For general information concerning the chemical composition and properties of isobutylidene diurea, see M. Hamamoto, Proceedings No. 90 Before The Fertiliser Society, "Isobutylidene Diurea as a Slow Acting Nitrogen Fertiliser and the Studies in This Field in Japan," paper read before The Fertiliser Society in London, Jan. 27, 1966, which is incorporated herein by reference and made a part hereof. Because of present manufacturing methods, there is a significant dust problem with commercially available grades of isobutylidene diurea, as well as other porous, granular fertilizer source materials.

It has been proposed to make a hardened granular agglomerate or prill from fine particles of a nitrogen source. For example, U.S. Pat. No. 4,560,400 proposes using a binder to bind fine particles of a poorly or slightly soluble nitrogen source to form a hardened agglomerate or prill. Such methods are typically used with nitrogen source materials having a certain size. In addition, the agglomeration or prilling machinery and equipment used to make such a hardened granular fertilizer are relatively expensive.

It has also been proposed to coat fertilizer granules with various coating materials to form so-called "slow acting" or "slow release" fertilizers, that is, fertilizers which dissolve more slowly in water and, therefore, provide a longer lasting fertilizing effect in the ground. Thus, U.S. Pat. No. 3,576,613 discloses subcoating powdered fertilizers and then encapsulating the subcoated particles with molten elemental sulfur. Similarly, U.S. Pat. No. 3,365,288 proposes coating granular fertilizer with a drying oily polyene polymer and then drying the coating. In U.S. Pat. No. 4,023,955, fertilizer material is encapsulated in a partially hydrated cement. U.S. Pat. No. 4,142,885 discloses a two-stage process in which granules of a preponderantly water-soluble granular fertilize composition is first subjected to accretive granulation and then coated with a suitable, almost impermeable envelopment, such as a plastic, wax, or molten sulfur. Finally, U.S. Pat. No. 4,082,533 proposes using two water insoluble coatings, the first consisting of masonry cement, and the second consisting of a blend of one or more polymers and a wax.

Because these coatings were not designed to prevent dust formation or harden the substrate, they have several drawbacks. When oil coatings are used, soft and porous materials that break, crush, and abrade do not maintain low dust levels because substantial quantities of the finer particles are not coated by these materials. Other coatings, such as wax and heavy resins, also have drawbacks. First, they are relatively expensive. In addition, sophisticated equipment is usually required to apply these coatings.

Another significant problem which may occur with these coatings is that they tend to dilute the available fertilizer source material in the coated material. For example, if granules of nitrogen source material are surrounded with a coating which does not provide a source of nitrogen, the nutritive value of the material per pound is decreased. As a result, more of the material must be used when it is mixed with the phosphorus and potassium components in making commercial grades of blended fertilizers. In addition, depending on the thickness of the coating, the cost of the material per unit of available nutrient may be significantly increased.

U.S. Pat. No. 4,711,659 discloses attrition resistant controlled release fertilizer particles. These particles include a water soluble central mass of fertilizer particles containing $NH_2$ groups, a base coating surrounding and chemically bonded to the central mass, and a water insoluble sealing layer surrounding and chemically bonded to the base coating. Because the base coating must be chemically bonded to the central mass and the sealing layer, it is necessary to use specific coating compounds, specific processing conditions, and, preferably, multiple coats of the sealing layer to obtain a suitable controlled release fertilizer.

Accordingly, it is an object of the present invention to provide a particulate or granular fertilizer source material which has been hardened and which has significantly increased resistance to dust formation, thereby helping to solve the economic and environmental problems associated with dust formation.

It is a further object of this invention to provide a process for making such a granular fertilizer source from commercially available grades of fertilizer compounds in an efficient and cost-effective manner using relatively simple and readily available equipment and materials.

It is yet a further object of this invention to provide a suitable hardened coating for granular fertilizers having odd or irregular shapes and protrusions or jagged edges on their surfaces.

It is yet a further object of this invention to provide a hardened coating for granular fertilizers consisting of both fine and course particles.

It is still a further object of this invention to provide a coating which does not substantially dilute the available nitrogen in a nitrogen fertilizer source material. IBDU ® is a registered trademark of Vigoro Industries, Inc. of Chicago, Ill.

SUMMARY OF THE INVENTION

It has been discovered that these and other objects may be achieved by providing an improved fertilizer composition including particles of a sparingly soluble fertilizer source with porous outer surfaces (for example, IBDU ®) which have been coated with a hard outer coating which substantially covers the surface of each of the particles and substantially fills the pores in the outer surface of each of the particles. In this way, the particles are individually hardened by the coating and are given increased resistance to abrasion and dust formation. The hardened outer coating is preferably formed when a liquid binder (preferably including a mixture of urea and a lignosulfonate) is sprayed onto the particles and then allowed to harden or cure. A process for making such hardened particles is also disclosed, including the steps of substantially covering the surface of each particle of the fertilizer source and substantially filling the pores on the surface of each particle with a binder, and allowing the binder to harden to give the particles increased resistance to dust formation.

The foregoing features and advantages of the present invention will be more readily understood upon consideration of the following detailed description, taken in conjunction with the accompanying drawing, in which:

DETAILED DESCRIPTION

Figure 1:
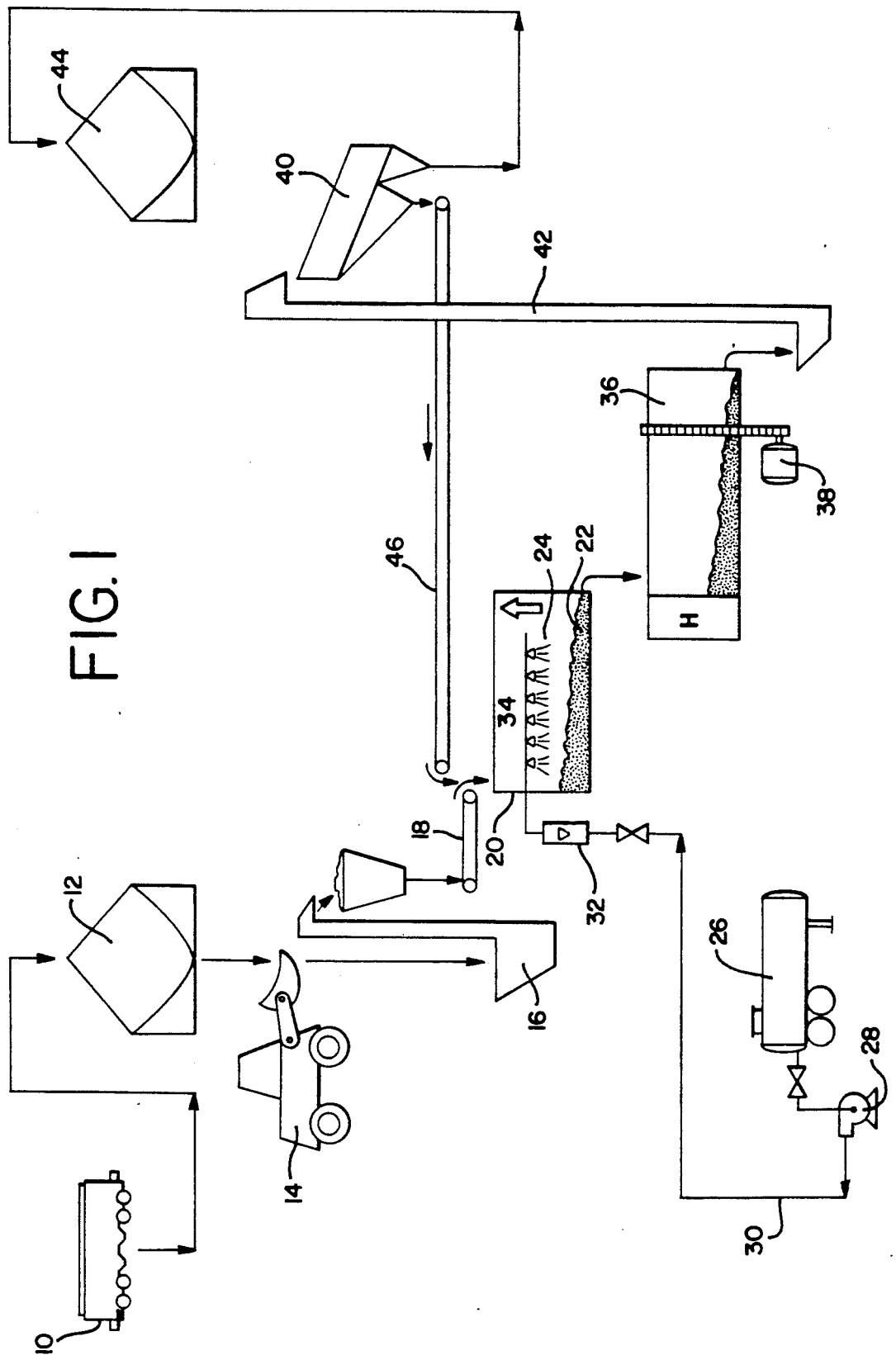
FIG. 1 is a flow chart, somewhat schematic in form, depicting one embodiment of the process used in practicing the present invention.

Granular fertilizer sources for use in making commercial blended fertilizers are available from a number of manufacturers. Typically, this material is purchased in bulk form. The material usually includes a mixture of particle sizes, which fall generally in the size range of $-6+12$ mesh.

For example, the commercially available nitrogen source isobutylidene diurea (sold by Vigoro Industries, Inc. under the trademark IBDU ®) is a granular product which includes particles generally falling in the size range $-6+18$ mesh to a fine powder. The granules have porous outer surfaces, i.e., holes or openings in their surfaces. Isobutylidene diurea is typically purchased from the manufacturer in bulk form, either in one ton bags or in railway cars. Isobutylidene diurea is sparingly soluble, i.e., it has a relatively low solubility in water, thereby making it a "slow-release" fertilizer.

Of course, it will be understood that other commercially available fertilizer source materials having a relatively low solubility in water also may have a dust problem and may be used in practicing the present invention. These include, by way of example, oxamide, urea formaldehyde-based fertilizers, dicyanamide, crotilidiene diurea, and metal ammonium phosphate (e.g., magnesium ammonium phosphate).

In addition, it will be understood that other commercially available source materials which are more freely soluble in water also may have a hardness or dust problem and may be hardened by means of the process disclosed herein to form hardened fertilizer particles. These materials include, by way of example, ammonium nitrate, ammonium sulfate, various types of coated and uncoated urea, dried fertilizer material recovered from sewage sludge, monoammonium phosphate, diammonium phosphate, triple super phosphate, calcium nitrate, sulfate of potash, and sulfate of potash magnesium.

Commercial grades of such fertilizer source materials contain particles having porous outer surfaces i.e., they have pores or openings covering all or a portion of their surfaces. In addition, some of these particles have protrusions or jagged, irregular edges. When the material is handled and processed, these edges break off, often creating undesirable dust. It has been discovered that this dust problem may be overcome in the following manner.

The process used to produce a coated fertilizer composition in accordance with the present invention is illustrated schematically in FIG. 1. The process is begun with commercially produced course grade IBDU ® in bulk form. In FIG. 1, the IBDU ® is illustrated as having been shipped in rail car 10. The IBDU ® is then off-loaded to a pre-treatment bulk storage pile 12. Payloader 14 is used to transfer the IBDU ® from the bulk storage pile 12 to a conventional weigh scale hopper 16. In the weigh scale hopper 16, an appropriate amount of IBDU ® is metered out and transferred onto conveyor 18. The conveyor 18 transfers the IBDU ® to rotating drum 20, such that a bed 22 of particles is created in the drum 20. The drum 20 is of conventional design; for example, a conventional rotating granulating drum may be used. The drum 20 is rotated so that the particles are continuously being tumbled and rolled during the coating process.

Next, and while the material is being tumbled and rolled in the drum 20, a binder is applied to the particles. Conventional spraying apparatus may be used for this purpose. In FIG. 1, the binder is supplied from tank truck 26. Pump 28 is used to pump the binder through appropriate conduits or pipes (indicated generally by arrows 30). Flow and pressure indicator 32 monitors the amount and pressure of binder being pumped to nozzles 34. The binder is forced under pressure through nozzles 34, thereby creating sprays 24 of binder directed at the tumbling bed 22 of particles. Spraying is continued until the surface of each of the particles is substantially covered with binder and the pores in the surface of each particle are substantially filled. As used herein, the term "each" is intended to mean that substantially all, or a significant quantity of, the particles are individually coated with binder. It will be understood that as larger quantities of particles are coated, it is increasingly difficult to coat all of the particles. It will also be understood that a small quantity of particles may agglomerate in the drum and thereby be coated together, although in general this is to be avoided.

In general, coating is completed when a sufficient portion of the surfaces of substantially all of the particles are covered without excess binder accumulating in the drum 20. Based upon gross visual observation, and without being limited thereto, it is believed that between about 95% and about 98% percent of the particles are preferably covered over more than 90% of their surfaces with the binder. (In the present detailed description and the examples which follow, all percentages are by weight, unless otherwise noted.)

In a preferred form, the binder is a liquid which is allowed to dry or harden on the surface of the particles to form a hard, outer coating. For example, the binder may be a molten liquid, which solidifies or hardens in the pores and on the surfaces of the porous particles. The binder may also be a solution or an emulsion, such that crystals or films of the solubilized or emulsified solids form in the pores and on the surfaces of the particles when the solvents or other liquids evaporate, thereby hardening the particles. However, it will be understood that the binder need not necessarily be a liquid so long as it is capable of hardening the particles and increasing their resistance to dust formation. For example, gases which react with the fertilizer substrate to form a resin that becomes a binder may be used. By way of example, gaseous formaldehyde reacts with IBDU ® and its constituents to form a hardened outer coating on the surface of the IBDU ® particles.

It has been discovered that particularly effective binders are formed when one or more of the above compounds is admixed with other materials, such as starches, or the class of compounds known as the lignosulfonates. The use of such additional binding materials is described in detail below.

It is preferred that the binder include a second source of nutritive fertilizer, e.g., a nutrient source which provides nutritive value in addition to the fertilizer substrate being coated. In this way, the amount of nutrient source per pound of the coated product is not significantly reduced or diluted. The coated product may thus be used to manufacture blended fertilizers in virtually the same quantities as uncoated granular fertilizers. This represents a significant advantage over other types of coatings, which tend to dilute the amount of available fertilizer.

It has been found that a number of compounds are particularly useful as binders in the practice of the present invention. In particular, molten urea or aqueous solutions of urea have been used with excellent results. Urea is itself an excellent nitrogen source and, therefore, does not significantly dilute the coated substrate. When molten urea is used, it is desirable, but not essential, to pre-heat the substrate particles prior to coating. In general, for batch processes, an aqueous solution consisting of between about 30 and 80 percent urea may be used, with superior results being achieved when a 40 percent urea solution is used. For continuous processes, these percentages may be reduced somewhat.

A heated aqueous urea solution having a very low moisture content, that is, on the order of 20% or less, is also believed to be a suitable binder. In particular, it is thought to be possible to apply such a urea solution to the particles and to harden the coating at ambient conditions without the addition of significant amounts of heat. Of course, it is preferred that the binder be capable of curing without the addition of heat, since this significantly reduces the cost of the process.

Thus far, it appears that consistently superior results are obtained when an aqueous mixture of urea and the calcium salt of lignosulfonic acid, i.e., calcium lignosulfonate, is used as a liquid binder. A commercially available source of calcium lignosulfonate that has been used with success is an aqueous lignosulfonate solution sold under the name "Norlig-A," manufactured by Aishowa Chemicals of 100 Highway 51 South, Rothschild, Wis. 54474. Literature accompanying this product indicates that it consists of 58% calcium lignosulfonate, 16% reducing sugars, 2-3% formic acid salts, and the remainder water. The calcium lignosulfonate mixes readily with the aqueous urea solution described above, thereby facilitating use in the present invention. For batch processes, a preferred urea/calcium lignosulfonate/water mixture consists of 40% urea and 13.3% calcium lignosulfonate, although mixtures falling in the range of about 30% to 50% urea and about 0% and 50% calcium lignosulfonate may also be used. For continuous processes, a preferred mixture consists of about 40% urea and about 10% calcium lignosulfonate.

Although calcium lignosulfonate has been used in combination with urea as the binder, as described above, it will be understood that other lignosulfonates, including metal or ammonium salts of lignosulfonic acid, may also be used in combination with urea or the other binder materials described above. In addition, other materials may also be admixed with the urea, including starches, such as corn starch, and natural and synthetic resins, such as urea formaldehyde.

Referring to FIG. 1, and as noted above, the binder is preferably sprayed onto the particles while they are tumbling and rolling in the rotary drum 20 so that a substantial portion of the surface area of each of the particles is coated and the binder material is incorporated into the pores in the surfaces of each of the particles. The binder is then allowed to harden or cure, thus giving the particles additional crushing hardness and anti-abrasion characteristics and significantly increasing their resistance to dust formation. It will be understood that in the case of molten binders, the binder will simply be permitted to harden by solidifying, while in the case of solubilized or emulsified solutions, the binder will be permitted to harden by drying. It is believed that crystals or films of the solid binder form on the surfaces and in the pores of the particles upon solidification or drying.

It is also possible to apply successive coats of any of the above binders prior to drying. For example, an initial coat consisting of an aqueous urea mixture may be sprayed on the particles, as described above. Before the urea binder has dried, a second coat of the same or different binder may be sprayed onto the particles. Suitable materials for such a second layer are the metal or ammonium salts of lignosulfonic acid (especially calcium lignosulfonate) or the starches or resin binders described above. In general, it is preferred that if aqueous urea is used, the urea layer be applied first, followed by the aqueous lignosulfonate solution.

When additional heat is required to effect hardening or drying, the heat preferably should be added in a rotary or a conveyor system, with streams of warm air being used to assist in removing moisture from, or solidifying, the binder as the particles are tumbling or conveyed in the dryer. Referring to FIG. 1, it will be seen that the binder-coated IBDU ® particles are transferred from the rotating drum 22 to a rotary dryer 36 for drying. Motor 38 rotates the dryer, and a conventional gas-fired hot air burner (indicated generally by the reference letter "H") provides the warm air. In this manner, the particles are dried uniformly and gently. Rotary drying also appears to help abrade the rough edges of compacted or non-spherical particles, thus making them less likely to break off and form more dust when they are handled and recycled for further processing. A counter-current rotary dryer, which supplies heated air at the discharge end of the drum, should give particularly satisfactory results.

In practicing the present invention, it is important to maintain an appropriate drying temperature. In general, the temperature should be sufficiently high so that the binder dries fairly rapidly (on the order of 200° F.), but lower than the decomposition temperature of the granular fertilizer substrate to which the binder has been applied. When IBDU ® is the substrate, the temperature of the product bed should not exceed 250° F. In general, for commercial grades of IBDU ® the temperature of the air in the dryer should be kept in the range of approximately 175° to 250° F., with an air temperature of about 200° F. being presently considered to be preferred. The temperature of the bed of particles should be maintained in the range of about 150° to 200° F., with a temperature of about 150° F. being preferred.

Drying proceeds until the particles have been hardened and have a maximum moisture content of between about 1.5% and about 2.0%. In general, drying is complete when the product has a hardened outer coating substantially covering the surface of each of the particles and substantially filling the pores in the surface of each of the particles, thereby giving them increased resistance to dust formation.

It will be seen that the fertilizer composition of the present invention may be formed in accordance with the above process, thus forming particles which are individually hardened. When the binder used is an aqueous mixture of a lignosulfonate and urea, after drying the hardened coating will comprise a solidified mixture of the lignosulfonate and urea in crystalline form.

In general, for −7+8 mesh spherical particles, dust levels are reduced to acceptable levels when the crushing strength of the −7+8 mesh spherical material has been increased so that it exceeds about 1.8 lbs., as measured using the particle hardness protocol described in NPFI Analytical Methods (2d ed. 1964), Method: "Particle Hardness," Reference No. 5.120, p. 126, published by the National Plant Food Institute, 1700 K Street, N.W., Washington, D.C. 20006.

It will also be understood that it may sometimes be desirable to repeat the above process after an initial coat of the binder has hardened or dried. In this way, it is possible to form successive layers of hardened coating on the granular fertilizer substrate. For example, an initial coat consisting of an aqueous urea mixture may be sprayed onto the particles and dried as described above. After the particles are dried, the coated particles may be recycled and a second layer of coating may be sprayed on and dried by repeating the process. Suitable materials for such a second layer are the metal or ammonium salts of lignosulfonic acid (especially calcium lignosulfonate), or the starches, resins, or other polymers described above. In general, the use of two drying steps will make such processes prohibitively expensive; however, in certain specialized applications it may be desirable to apply successive coatings in this fashion.

Referring again to FIG. 1, after the coated IBDU ® particles are dried, they are transferred from the dryer 36 to screen 40 by means of transfer hopper 42. The screen 40 separates particles having a desired size. The selected particles are transferred to a coated IBDU ® bulk storage pile 44 to be further processed into commercial fertilizers. Undersized and oversized particles are recycled to the rotating drum by way of return belt 46 and conveyor belt 18. In this way, loss of material is significantly reduced.

The following specific examples are illustrative of processes which may be used in the practice of the present invention and of the coated fertilizer compositions produced thereby.

EXAMPLE 1

A plant scale test was conducted to coat coarse grade IBDU ®. Approximately 80 tons of coated product were produced. FIG. 1 shows the general arrangement of equipment used to perform the coating test. The urea-lignin binder solution was prepared before the test by mixing 11,500 lbs. of 50% urea solution and 1,800 lbs. of the Aishowa Chemicals "Norlig-A" product described above.

The IBDU® was transferred by payloader to a weigh hopper from which it was metered into a granulating drum at a rate of 10 tons per hour. The flow rate of solution was approximately 2.5 gallons per minute. The binder solution was sprayed onto the surface of the IBDU® in the rotating granulator drum. The wet material then fell into the inlet of a gas-fired dryer having a diameter of about 8 feet. The gas-fired dryer operated at about 350° F. on the inlet and about 160° F. on the outlet after the final adjustments were made. The dryer was rotated at approximately 8-10 rpm, and the IBDU® was retained in the dryer for approximately 5-8 minutes. The coated product was very dry, at less than 1% moisture.

The dry product was fed to an 18-mesh tie-rod-type screen. The nominal opening was approximately 1.0-1.2 mm. There was a significant amount of leakage around the screens, and some of the spherical coarse grade passed through the screen. In retrospect, it may have been preferable to use about a 0.8 mm screen. The dust collector fines and screen fines were fed back to the granulator drum. None of the fine material was agglomerated in the granulator drum. To prevent the fines from building up in the system and to reduce the loss of spherical coarse grade, the fines were diverted to the floor for one hour, then back to the drum for one hour. The screen vibrators were also shut off, which allowed the lower 50% of the screens to "blind," or seal off with product which substantially clogs the openings. Random samples taken by hand from the screen showed that the fines were effectively removed from the product, and more of the spherical coarse grade material was recovered.

The dry product fell 40 feet to a bulk storage pile. The product was loaded into a hopper car and shipped for further processing. The product was sampled as it was being loaded into the car. A size distribution was run on the material taken from the edge of the pile and from the middle of the pile. It was obvious that the fines collect in the middle of the pile. Whereas the sides showed almost no fines, the middle of the pile had almost 7.5% fines. The product was unloaded at another location into a bulk storage pile. The product had little visible dust and was significantly improved over normal coarse grade IBDU®.

EXAMPLE 2

Granular particles of the nitrogen source isobutylidene diurea (IBDU®) having a size of −6+20 mesh were placed in a drum rotating at approximately 15 rpm. As the granules were being tumbled and rolled in the drum, they were sprayed with a solution of 53.5% water, 6.5% of the Norlig-A product referred to above (3.8% calcium lignosulfonate), and 40% urea. The solution was sprayed onto approximately 50-100 lbs. of particles using a common garden sprayer with a misting nozzle. Spraying was continued until the solution substantially filled the pores of each of the IBDU® particles and substantially coated the surfaces of each of the particles. The product was then dried in the same drum by circulating air over the particles with a heat gun, the air being at a temperature of approximately 300° F. The air caused the temperature of the bed of granules to rise from ambient temperature to about 150° F. Air circulation was continued until the particles were dried to a moisture content of approximately 1-2%.

Analysis (by material balance) revealed that the resulting particles contained 95.5% IBDU®, 1.1% water, 3.0% urea, 0.3% calcium lignosulfonate, and 0.1% inert ingredients (i.e., reducing sugars and formic acid salts). Hardness was much greater than the uncoated IBDU® particles and abrasion tests showed improved resistance to abrasion and dust formation over uncoated particles of IBDU®.

EXAMPLE 3

The steps set forth in Example 2 were followed, except that a solution of 50% water, 20% Norlig-A, and 30% urea was used to coat the particles. Analysis revealed that the resulting particles contained 95.1% IBDU®, 2.6% water, 1.5% urea, 0.6% calcium lignosulfonate, and 0.2% inert ingredients. Abrasion tests showed improved resistance to abrasion and dust formation over uncoated particles of IBDU®.

EXAMPLE 4

The steps set forth in Example 2 were followed, except that a solution of 50% water, 17% Norlig-A, and 33% urea was used to coat the particles. Analysis revealed that the resulting particles contained 95.0% IBDU®, 2.2% water, 2.0% urea, 0.6% calcium lignosulfonate, and 0.2% inert ingredients. Abrasion tests showed improved resistance to abrasion and dust formation over uncoated particles of IBDU®.

EXAMPLE 5

The steps set forth in Example 2 were followed, except that a solution of 50% water, 10% Norlig-A, and 40% urea was used to coat the particles. Analysis revealed that the resulting particles contained 93.8% IBDU®, 1.4% water, 4.0% urea, 0.6% calcium lignosulfonate, and 0.2% inert ingredients. Abrasion tests showed improved resistance to abrasion and dust formation over uncoated particles of IBDU®.

EXAMPLE 6

The steps set forth in Example 2 were followed, except that a solution of 60% water and 40% urea was used to coat the particles. Analysis revealed that the resulting particles contained 95.8% IBDU®, 2.2% water and 2.0% urea. Abrasion tests showed improved resistance to abrasion and dust formation over uncoated particles of IBDU®.

EXAMPLE 7

The steps set forth in Example 2 were followed, except that two solutions were used to coat the particles prior to drying. First, a solution of 60% water and 40% urea was used to coat the particles. Prior to drying, a second solution consisting of 50% water and 50% Norlig-A was applied. Analysis revealed that the resulting particles contained 96.5% IBDU®, 1.1% water, 2.0% urea, 0.3% calcium lignosulfonate, and 0.1% inert ingredients. Abrasion tests showed improved resistance to abrasion and dust formation over uncoated particles of IBDU®.

EXAMPLE 8

The steps set forth in Example 2 were followed, except that two solutions were used to coat the particles prior to drying. First, a solution of 60% water and 40% urea was used to coat the particles. Prior to drying, a second solution consisting of 50% water and 50% Norlig-A was applied. Analysis revealed that the resulting particles contained 96.2% IBDU®, 1.0% water, 2.0% urea, 0.6% calcium lignosulfonate, and 0.2% inert ingredients. Abrasion tests showed improved resistance to abrasion and dust formation over uncoated particles of IBDU ®.

EXAMPLE 9

The steps set forth i Example 2 were followed, except that two solutions were used to coat the particles prior to drying. First, a solution of 60% water and 40% urea was used to coat the particles. Prior to drying, a second solution consisting of 50% water and 50% Norlig-A was applied. Analysis revealed that the resulting particles contained 94.4% IBDU ®, 1.2% water, 4.0% urea, 0.3% calcium lignosulfonate, and 0.1% inert ingredients. Abrasion tests showed improved resistance to abrasion and dust formation over uncoated particles of IBDU ®.

EXAMPLE 10

The steps set forth in Example 2 were followed, except that two solutions were used to coat the particles prior to drying. First, a solution of 60% water and 40% urea was used to coat the particles. Prior to drying, a second solution consisting of 50% water and 50% Norlig-A was applied. Analysis revealed that the resulting particles contained 93.5% IBDU ®, 1.7% water, 4.0% urea, 0.6% calcium lignosulfonate, and 0.2% inert ingredients. Abrasion tests showed improved resistance to abrasion and dust formation over uncoated particles of IBDU ®.

EXAMPLE 11

The steps set forth in Example 2 were followed, except that a solution of 60% water and 40% urea was used to coat the particles. Analysis revealed that the resulting particles contained 95.3% IBDU ®, 0.7% water and 4.0% urea. Abrasion tests showed improved resistance to abrasion and dust formation over uncoated particles of IBDU ®.

The following tabulation shows the results of hardness tests on the coated compositions formed in Examples 3-11 above as compared to a "Control" consisting of uncoated IBDU ® particles. The hardness tests were conducted by (1) measuring the percentage of −20 mesh particles in a sample of product produced by the process of a particular Example (see above), (2) subjecting the sample particles to a timed abrasive action, (3) measuring the percentage of −20 mesh particles in the sample after abrasion, and (4) calculating the relative increase in −20 mesh particles. It can be seen that as the relative increase in −20 mesh particles decreases, the hardness of the particles increases.

| Sample | Crushing Pressure (lbs.) | % −20 Mesh (Before Abrasion) | % −20 Mesh (After Abrasion) | Relative % Increase |
|---|---|---|---|---|
| Control | 1.22 | 1.6 | 2.8 | 75 |
| Ex. 3 | 1.63 | 1.8 | 2.5 | 39 |
| Ex. 4 | 1.47 | 1.7 | 2.2 | 29 |
| Ex. 5 | 2.13 | 1.0 | 1.2 | 20 |
| Ex. 6 | 1.38 | 1.5 | 2.2 | 38 |
| Ex. 7 | 1.82 | 2.3 | 2.4 | 4 |
| Ex. 8 | 1.84 | 2.0 | 2.0 | 0 |
| Ex. 9 | 1.89 | 1.6 | 1.6 | 0 |
| Ex. 10 | 1.72 | 1.3 | 1.3 | 0 |
| Ex. 11 | 2.06 | 1.4 | 1.5 | 7 |

The following additional examples further illustrate the practice of the present invention:

EXAMPLE 12

The steps set forth in Example 2 were followed, except that a solution of UF 85 was used to coat the particles. (UF 85 is an 85% aqueous solution of urea formaldehyde.) The resulting particles contained 93% IBDU ®, 6.0% UF 85, and 1.0% water. Abrasion tests showed improved resistance to abrasion and dust formation over uncoated particles of IBDU ®.

EXAMPLE 3

Granular particles of IBDU ® were placed in an apertured basket and held over a boiling beaker of formaldehyde solution in a hood for one minute. (The boiling solution was a 37% aqueous solution of formaldehyde.) The gaseous formaldehyde reacted with the IBDU ® and its constituents to form a coating which individually covered each of the IBDU ® particles. The coating was permitted to cure at ambient conditions, thereby forming a hard, outer coating on the IBDU ® particles. Abrasion tests showed that the coated particles had improved resistance to abrasion and dust formation over uncoated particles of IBDU ®.

EXAMPLE 14

The steps set forth in Example 13 were followed, except that the IBDU ® particles were held over the boiling formaldehyde solution for two minutes. Abrasion tests showed that the coated particles had improved resistance to abrasion and dust formation over uncoated particles of IBDU ®.

EXAMPLE 15

The steps set forth in Example 2 were followed, except that a 19% aqueous solution of ammonium nitrate was used to coat the particles. Abrasion tests showed improved resistance to abrasion and dust formation over uncoated particles of IBDU ®.

EXAMPLE 16

The steps set forth in Example 2 were followed, except that a 50% aqueous solution of potassium nitrate was used to coat the particles. The resulting particles contained 95.5% IBDU ®, 3.0% potassium nitrate, and 1.5% water. Abrasion tests showed improved resistance to abrasion and dust formation over uncoated particles of IBDU ®.

The following tabulation shows the results of hardness test on the coated compositions formed in Examples 12-16 above. The crushing pressure for the coated particles may be compared to the "Control" from the preceding Table.

| Sample | Crushing Pressure (lbs.) |
|---|---|
| Ex. 12 | 5.50 |
| Ex. 13 | 2.30 |
| Ex. 14 | 3.42 |
| Ex. 15 | 1.72 |
| Ex. 16 | 1.51 |

It is apparent from the above that hardness and resistance to abrasion and consequent resistance to the formation of dust has been significantly increased when commercially available IBDU ® is treated by the process of this invention.

While the invention has been described in connection with certain present embodiments, those skilled in the art will recognize many modifications to structure, arrangement, portions, elements, materials, components, and steps which can be used in the practice of the invention without departing from the principles thereof.

We claim:

1. A process for making a fertilizer composition comprising:
   providing particles of isobutylidene diurea, said particles having porous outer surfaces,
   substantially covering the surface of each particle and substantially filling the pores in the surface of each particle with an aqueous mixture of a lignosulfonate and urea, and
   allowing said solution to dry to form a hard, outer coating, whereby said particles are hardened and given increased resistance to dust formation.

2. The process of claim 1, in which said lignosulfonate is a metal or ammonium salt of lignosulfonic acid.

3. The process of claim 1, in which said lignosulfonate is calcium lignosulfonate.

4. The process of claim 1, in which said aqueous mixture comprises between about 30 and about 80 percent by weight urea and between about 5 and about 50 percent by weight lignosulfonate.

5. A fertilizer composition comprising:
   (a) particles of an isobutylidene diurea fertilizer substrate, said particles having porous outer surfaces; and
   (b) a hard coating comprising a urea source composition comprising urea and a lignosulfonate substantially covering the surface and substantially filling the pores of each particle, the hard coating being formed by applying the urea source composition to the isobutylidene diurea fertilizer substrate particles and allowing the urea source composition to harden or cure;
   wherein said fertilizer composition has improved resistance to dust formation and wherein the urea source composition provides nutritive value in addition to the isobutylidene diurea fertilizer substrate such that the nutrient value of the coated isobutylidene diurea fertilizer composition is not significantly reduced or diluted.

6. The fertilizer composition of claim 5, wherein the urea component of said urea source composition comprises molten urea.

7. The fertilizer composition of claim 5, wherein the urea component of said urea source composition comprises an aqueous solution of urea.

8. The fertilizer composition of claim 5, wherein the lignosulfonate comprises a metal or ammonium salt of lignosulfonic acid.

9. The fertilizer composition of claim 5, wherein the urea source composition comprises between about 30 percent and about 80 percent by weight of urea and between about 5 percent and about 50 percent by weight of lignosulfonate.

10. The fertilizer composition of claim 5, wherein the urea source composition is applied to the isobutylidene diurea fertilizer substrate by spraying.

11. A process for making a fertilizer composition comprising:
    (a) providing particles of an isobutylidene diurea fertilizer substrate, said particles having porous outer surfaces;
    (b) substantially coating the surface and filling the pores of each particle with a urea source composition comprising a urea composition and a lignosulfonate; and
    (c) allowing the urea source composition to harden or cure to form a hard, outer coating on said particles;
    wherein said coated particles have increased hardness and resistance to dust formation, and wherein said coating provides nutritive value in addition to the isobutylidene diurea fertilizer substrate.

12. The process of claim 11, wherein the urea source composition is applied to the isobutylidene diurea fertilizer substrate in a two-step process, the first step comprising applying the urea composition and the second step comprising applying the lignosulfonate.

* * * * *